(12) United States Patent
Hahne

(10) Patent No.: US 7,360,819 B1
(45) Date of Patent: Apr. 22, 2008

(54) QUICK-RELEASE MOTORCYCLE WINDSHIELD

(75) Inventor: Jesse Hahne, Anoka, MN (US)

(73) Assignee: Sportech, Inc., Elk River, MN (US)

( * ) Notice: Subject to any disclaimer, the term of this patent is extended or adjusted under 35 U.S.C. 154(b) by 4 days.

(21) Appl. No.: 11/551,880

(22) Filed: Oct. 23, 2006

(51) Int. Cl.
*B62J 17/04* (2006.01)

(52) U.S. Cl. ................... 296/78.1; 296/77.1

(58) Field of Classification Search ........... 296/77.1, 296/78.1, 96.12
See application file for complete search history.

(56) References Cited

U.S. PATENT DOCUMENTS

| | | | |
|---|---|---|---|
| 4,615,556 A | * | 10/1986 | Stahel ............ 296/78.1 |
| 6,808,219 B2 | | 10/2004 | Barber et al. |
| 6,942,131 B2 | | 9/2005 | Trautman et al. |
| 6,974,175 B2 | | 12/2005 | Willey |
| 6,983,973 B2 | | 1/2006 | Susuki |
| 6,983,974 B2 | | 1/2006 | Susuki |
| 7,044,530 B1 | | 5/2006 | Hahne |
| 7,090,280 B2 | * | 8/2006 | Willey ............ 296/78.1 |

FOREIGN PATENT DOCUMENTS

GB 745603 * 2/1953 ............ 296/78.1

* cited by examiner

*Primary Examiner*—Dennis H. Pedder
(74) *Attorney, Agent, or Firm*—Elizabeth D. Lewen; Sherrill Law Offices, PLLC

(57) ABSTRACT

A windshield assembly comprising a windshield panel and a coupling assembly. The coupling assembly is configured and arranged for fixed attachment to the windshield panel and releasable attachment to a vehicle by means of an outwardly biased ball bearing and detent system wherein the biasing force is adjustable.

7 Claims, 4 Drawing Sheets

QUICK-RELEASE MOTORCYCLE WINDSHIELD

BACKGROUND

Open motorized vehicles such as motorcycles are commonly used for recreational and utility purposes. Many motorcycles are not equipped with windshield panels. The lack of a windshield panel allows wind and debris to blow in the face of the motorcycle operator, decreasing the visibility and comfort of the operator during use. After market windshield panels have been developed for use with most motorcycles.

Depending on the type of use of the motorcycle, a windshield may not always be necessary or desirable. It may even be desirable to have different types of windshields depending on the environment the motorcycle will be subjected to during use. The industry has developed a windshield panel that is removably attached to the motorcycle to allow the windshield panel to be removed or replaced with a new windshield panel. There are many different mounting systems to allow fixed attachment to the motorcycle or removable attachment. A typical means of removably attaching a windshield panel to a motorcycle is disclosed in U.S. Pat. No. 6,974,175 B2 ('175). The '175 coupling assembly attaches to the motorcycle fork tube by means of a pair of straps for each leg of the tube. Each pair of straps is connected to a base that has a pair of flanged wheels. The flanged wheels then deflect to allow their insertion into corresponding slots on a bracket affixed to the windshield. The amount of pressure needed to remove the windshield from the coupling assembly is a fixed amount of pressure to allow for a quick removal of the windshield. It does not allow for easy adjustment of the amount of force needed to remove the windshield panel as required by different conditions. It also requires attachment to the handlebar fork of the motorcycle.

Therefore, what is needed is a quick-release coupling assembly that may be attached directly to the handlebars and easily allows for adjustment of the amount of force needed to remove the windshield panel from the coupling assembly.

SUMMARY OF THE INVENTION

A windshield assembly comprising a windshield panel and a coupling assembly. The coupling assembly is configured and arranged for fixed attachment to the windshield panel and releasable attachment to a vehicle by means of an outwardly biased ball bearing and detent system wherein the biasing force is adjustable.

DETAILED DESCRIPTION OF A PREFERRED EMBODIMENT

Definitions

Figure 1:
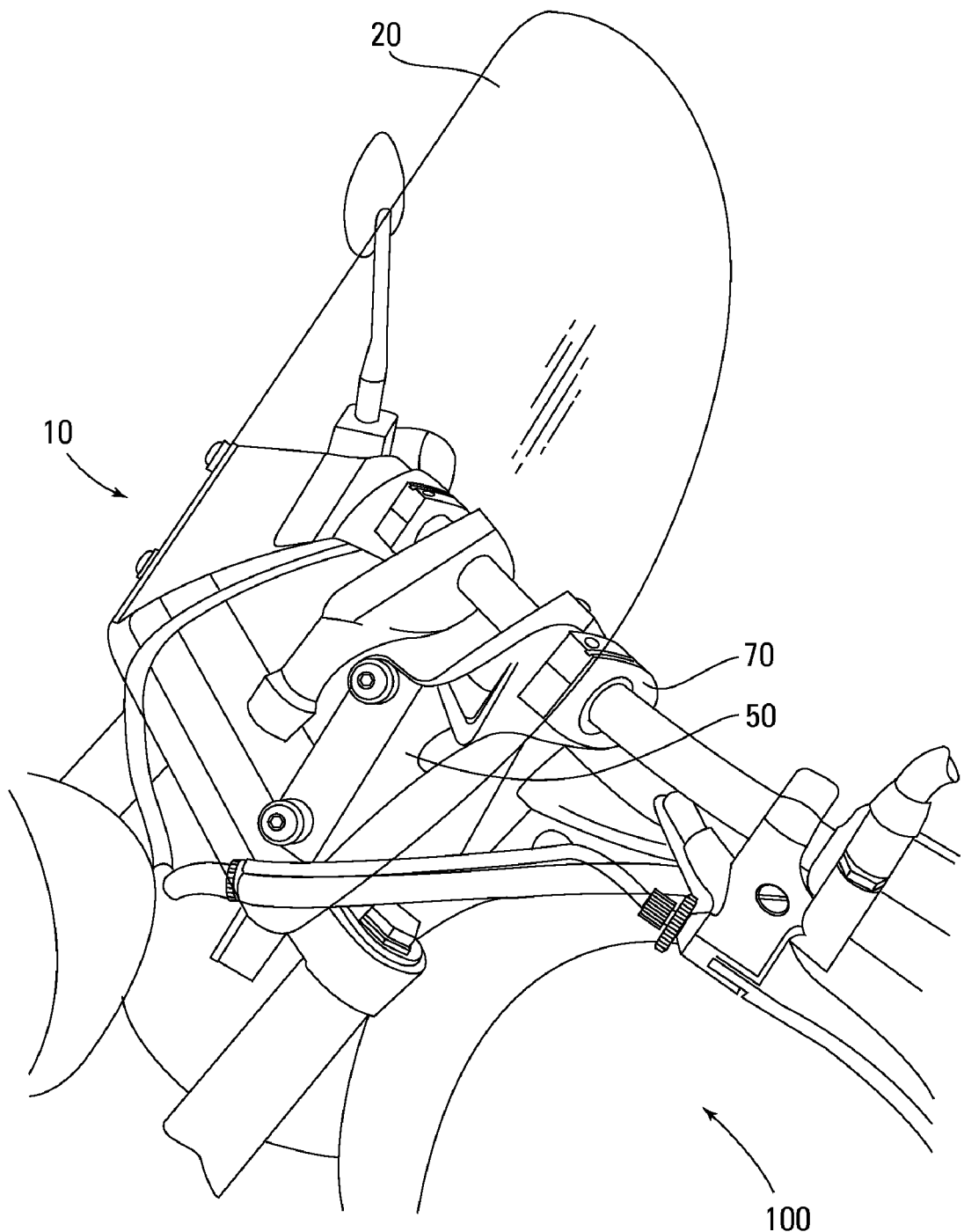
FIG. 1 is a side perspective view of one embodiment of the windshield assembly installed on a motorcycle.

As utilized herein, including the claims, the term "vehicle," refers to an open vehicle having handlebars for steering.

| Nomenclature | |
|---|---|
| 10 | Windshield assembly |
| 20 | Windshield panel |
| 30 | Coupling assembly |
| 40 | First mounting arm |
| 41 | First end |
| 41a | Receiving member |
| 41b | Leg |
| 41c | Detent |
| 41d | Point of attachment |
| 42 | Second end |
| 42a | Point of attachment |
| 50 | Second mounting arm |
| 51 | First end |
| 51a | Receiving member |
| 51b | Leg |
| 51c | Detent |
| 51d | Point of attachment |
| 52 | Second end |
| 52a | Point of attachment |
| 60 | First docking mechanism |
| 61 | Mounting bracket |
| 61a | Top Member |
| 61b | Bottom Member |
| 61x | Height |
| 61z | Length |
| 62 | Channel |
| 63 | Bore |
| 64 | Ball bearing assembly |
| 64a | Spring |
| 64b | Set Screw |
| 64c | Ball bearing |
| 70 | Second docking mechanism |
| 80 | Fastener |
| 100 | Motorcycle |
| 110 | Handlebars |
| x | longitudinal direction |
| y | lateral direction |
| z | transverse direction |

Construction

The windshield assembly 10 may be used to attach a windshield panel 20 to a vehicle and quickly remove the windshield panel 20 without any tools. Vehicles such as motorcycles 100, all terrain vehicles, and snowmobiles have no windshield panel 20 or the windshield panels 20 are subject to replacement due to damage or customization. Windshield panels 20 are a popular aftermarket accessory for motorcycles 100. Therefore, the remainder of the discussion will be based upon motorcycles 100. Limiting the remainder of the discussion to use of the invention on a motorcycle 100 is not intended to limit the invention. It should be recognized that the invention may apply not only to motorcycles 100 but also other vehicles such as all terrain vehicles, snowmobiles, three wheeled vehicles, etc.

As shown in FIG. 1, one embodiment of the windshield assembly 10 comprises a windshield panel 20 and a coupling assembly 30. The windshield panel 20 may be configured from any suitable material. Preferably the windshield panel 20 is configured from a transparent and strong material such as polycarbonate plastic. The windshield panel 20 may also be configured entirely or partially from an opaque and strong material as long as the motorcycle 100 operator's vision is not impaired by the windshield panel 20.

The coupling assembly 30 is configured and arranged for fixed attachment to the windshield panel 20 and quick-release attachment to a motorcycle 100 by means of an outwardly biased ball bearing and detent system (not numbered). The ball bearing and detent system may have a first mounting arm 40 and a second mounting arm 50. The first mounting arm 40 may have at least a first end 41 and a second end 42. The second mounting arm 50 may have at least a first end 51 and a second end 52.

The first end 41 of the first mounting arm 40 may define a point of attachment 41*d* and have a substantially U-shaped receiving member 41*a* having a detent 41*c* in at least one of the legs 41*b* of the receiving member 41*a*. Preferably the U-shaped receiving member 41*a* has a detent 41*c* in each leg 41*b* wherein the detents 41*c* are a mirror image of each other.

The first end 51 of the second mounting arm 50 may define a point of attachment 51*d* and have a substantially U-shaped receiving member 51*a* having a detent 51*c* in at least one of the legs 51*b* of the receiving member 51*a*. Preferably the U-shaped receiving member 51*a* has a detent 51*c* in each leg 51*b* wherein the detents 51*c* are a mirror image of each other.

Figure 4:
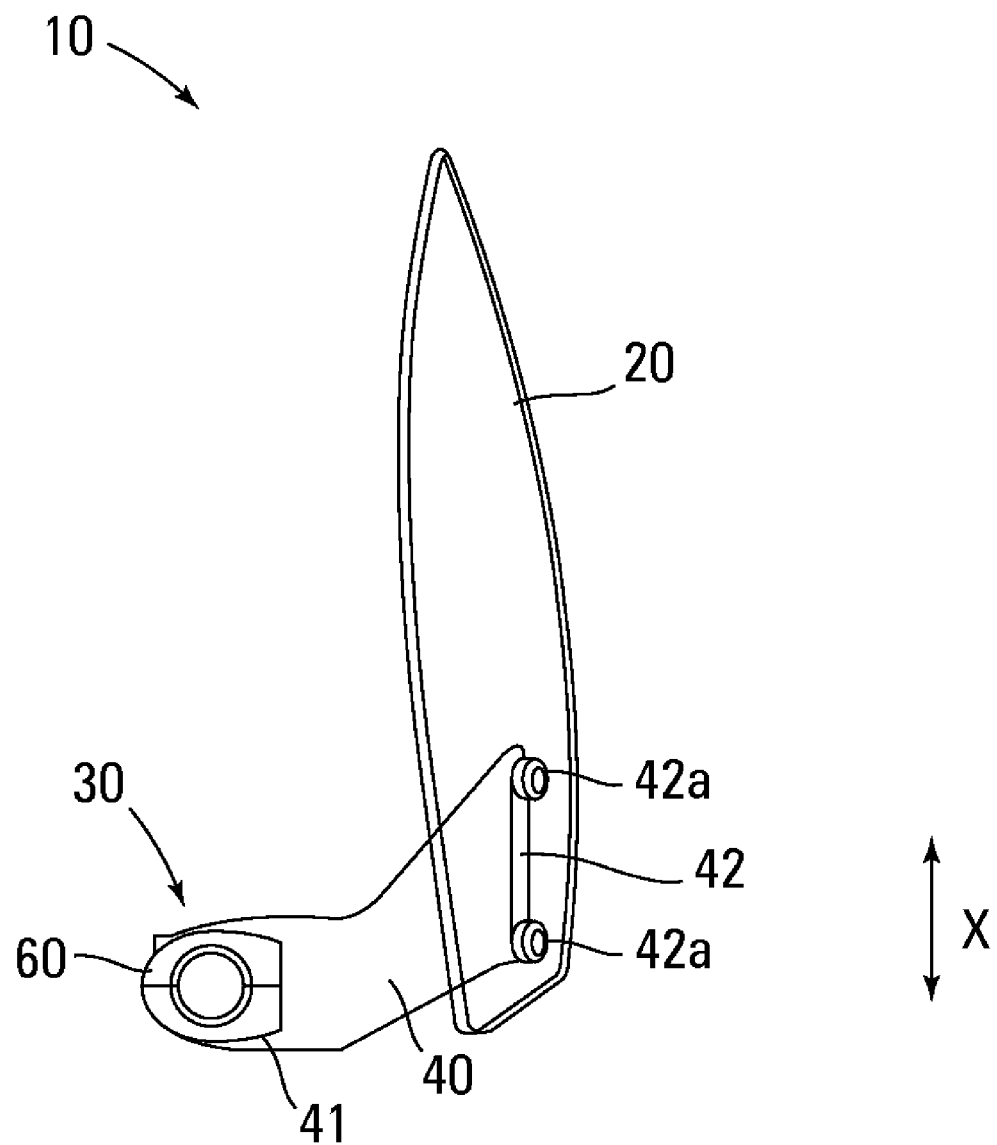
FIG. 4 is a side perspective view of the windshield assembly in FIG. 1 with the mounting arms rotated 180°.

The second ends 42, 52 of the first mounting arm 40 and second mounting arm 50 may define one or more points of attachment 42*a*, 52*a* each and be configured and arranged for fixed attachment to a windshield panel 20. Preferably at least one point of attachment 42*a*, 52*a* of each second end 42, 52 is longitudinally x offset from its respective first end 41, 51. The longitudinal x offset allows for a variation in handlebar 110 height between different models of motorcycles 100. As shown in FIGS. 1 and 4, the longitudinal x offset allows the first mounting arm 40 and second mounting arm 50 to be rotated 180° to change the height of the windshield panel 20 in relation to the handlebars 110.

At least one point of attachment 42*a* of the second end 42 of the first mounting arm 40 and at least one point of attachment 52*a* of the second end 52 of the second mounting arm 50 are also preferably laterally y offset from their respective points of attachment 41*d*, 51*d* at the first ends 41, 51. Providing laterally y offset points of attachment 42*a*, 52*a* of the second ends 42, 52 allows the motorcycle 100 operator (not shown) to switch the positions of the first mounting arm 40 and second mounting arm 50 to accommodate variations in handlebar 110 assemblies.

The outwardly biased ball bearing and detent system may also include a first docking mechanism 60 and a second docking mechanism 70. In one embodiment of the ball bearing and detent system, the first docking mechanism 60 has a mounting bracket 61, an outwardly biased ball bearing assembly 64 having at least a ball bearing 64*c*, and a channel 62. The second docking mechanism 70 is a mirror image of the first docking mechanism 60.

The mounting bracket 61 may include a top member 61*a* and a bottom member 61*b*. The upper portion (not numbered) of the top member 61*a* has a channel 62 along the entire transverse z length 61*z*. The lower portion (not numbered) of the top member 61*a* is formed into an arcuate surface (not numbered) configured and arranged for mating with a tubular member such as a handlebar 110.

The upper portion (not numbered) of the bottom member 61*b* has an arcuate surface (not numbered) that is a mirror image of the lower portion (not numbered) of the top member 61*a*. The lower portion (not numbered) of the bottom member 61*b* has a channel 62 along the entire transverse z length 61*z* that is a mirror image of the top portion (not numbered) of the top member 61*a*. The channels 62 are configured and arranged to allow a leg 41*b* from the substantially U-shaped receiving member 41*a* of the first mounting arm 40 to slide along the transverse z length 61*z* of the first docking mechanism 60.

Figure 3:
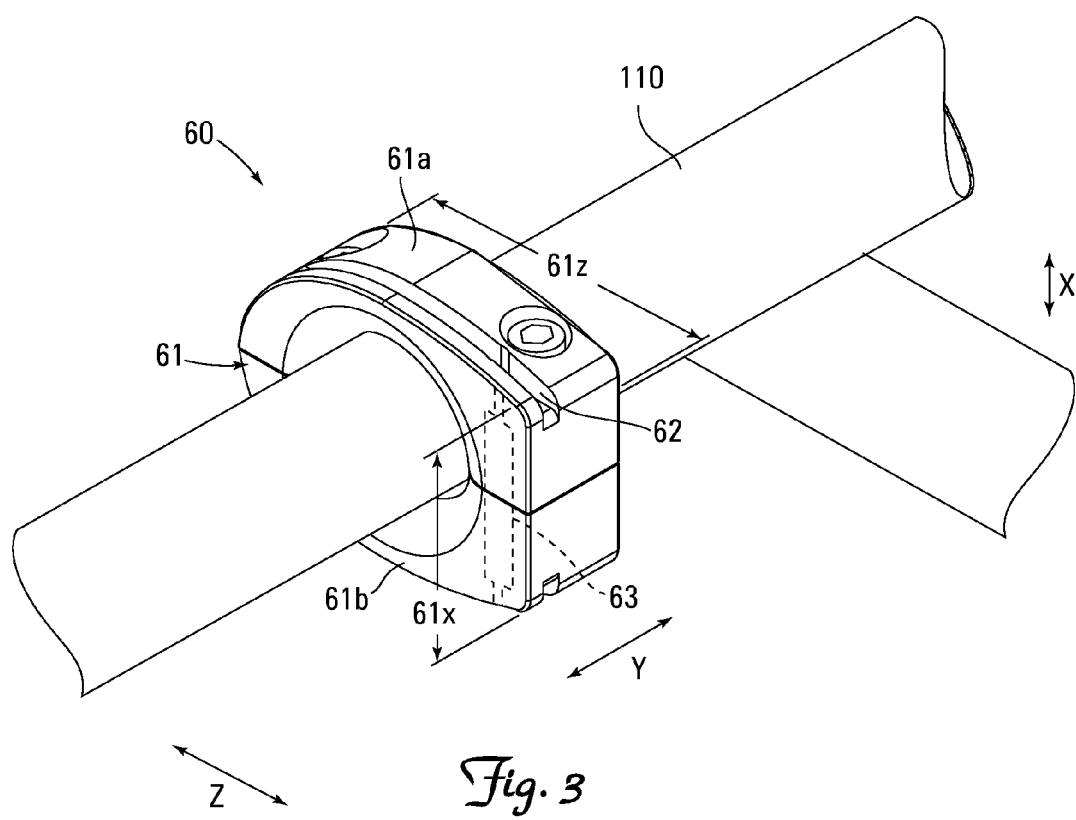
FIG. 3 is a side perspective view of the docking assembly in FIG. 1.

The mounting bracket 61 may have a longitudinal x bore 63 through the longitudinal x height 61*x* of the mounting bracket 61 with an openings (not numbered) in the channels 62 in the top member 61*a* and the bottom member 61*b*. The diameter (not numbered) of the bore 63 is slightly larger than the diameter (not numbered) of the ball bearing 64*c* in the ball bearing assembly 64. As shown in FIG. 3, the bore 63 may also have flanges (not numbered) proximate the openings in the channels 62 in the top member 61*a* and the bottom member 61*b* that reduces the diameter of the bore 63 to slightly less than the diameter of the ball bearing 64*c*. The bore 63 in the top member 61*a* and bottom member 61*b* is configured and arranged to allow for alignment of a detent 41*c* in a leg 41*b* of the substantially U-shaped receiving member 41*a* of the first mounting arm 40 with the bore 63 openings when the legs 41*b* are slid into the channels 62.

The ends (not numbered) of the top member 61*a* of the mounting bracket 61 and the opposing ends of the bottom member 61*b* are configured and arranged to be placed in alignment with one another when the first docking mechanism 60 is assembled to provide a passageway (not numbered) for mounting the first docking mechanism 60 on the motorcycle 100.

The ball bearing assembly 64 may be placed within the longitudinal x bore 63 of the mounting bracket 61. The ball bearing 64*c* is placed within the longitudinal x bore 63 in the bottom member 61*b* of the mounting bracket 61. As the diameter of the ball bearing 64*c* is slightly smaller than the diameter of the longitudinal x bore 63 but slightly larger than the diameter at the opening in the channel 62, the ball bearing 64*c* will protrude into the channel 62 of the bottom member 61*b* when outwardly biased.

The ball bearing 64*c* in the ball bearing system 64 may be outwardly biased by any suitable biasing means, including, a spring 64*a*, pneumatic cylinder or any type of resilient elastomer. The preferred biasing means is a coil spring 64*a*. The biasing means exerts a biasing force on the ball bearing 64*c*. The biasing force may be adjustable. The means of adjustment may be by any suitable means including a pall and ratchet system, a pin, an off-center cam, a bolt, or a screw. The preferred method of adjusting the biasing force is with a set screw 64*b*. In the preferred embodiment the set screw 64*b* is accessed to adjust the biasing force through the longitudinal x bore 63 opening in the channel 62 of the top member 61*a* of the mounting bracket 61.

Figure 2:
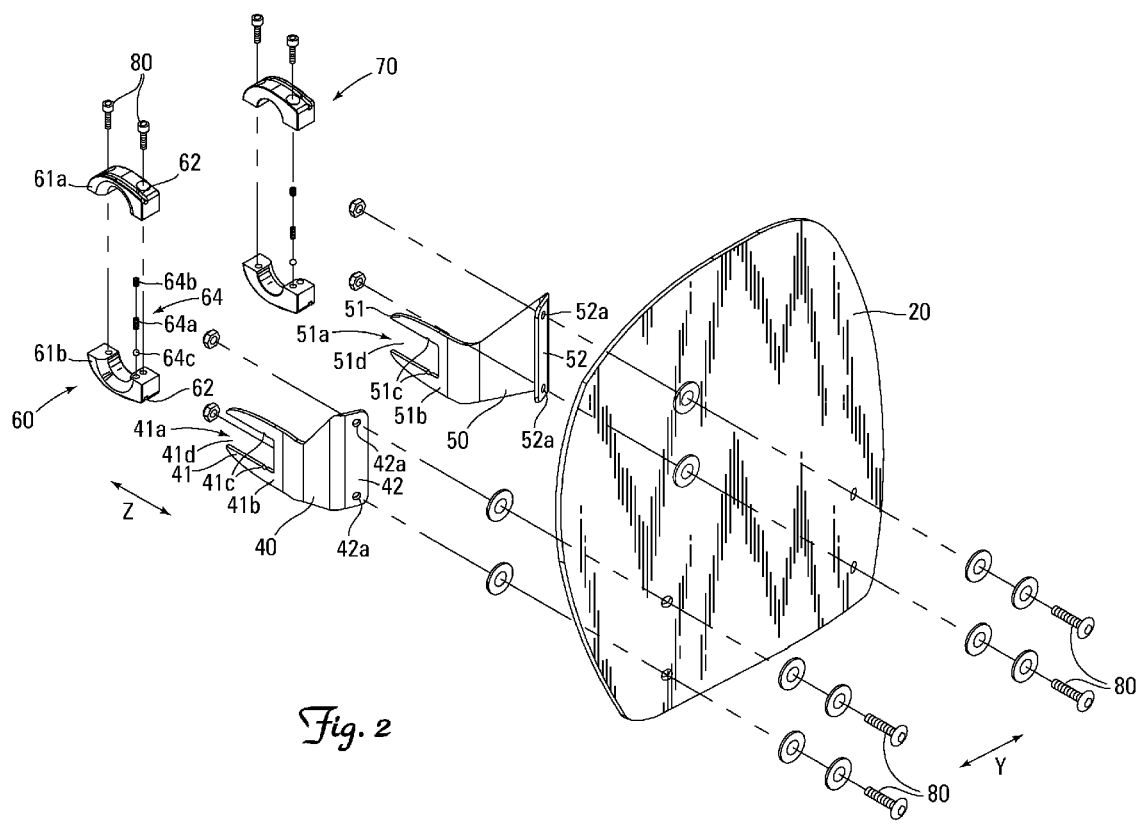
FIG. 2 is an exploded view of the windshield assembly in FIG. 1.

The first and second docking mechanisms 60, 70 are configured and arranged to fixedly attach to a portion of a motorcycle 100, preferably the handlebars 110. The first docking mechanism 60 and second docking mechanism 70 may be secured to the handlebars 110 by any suitable means, including, an off-center cam, clamshell bracket, pawl and ratchet, hook and latch, and screws. The preferred means is screws as shown in FIG. 2.

Use

Use of the windshield assembly 10 is generally initiated by attaching the first mounting arm 40 and second mounting arm 50 to the windshield panel 20. Preferably the first mounting arm 40 and second mounting arm 50 have both a longitudinal x offset and a lateral y offset. Fasteners 80 may be used to secure the first mounting arm 40 and second mounting arm 50 to the windshield panel 20. As shown in FIG. 4, the preferred orientation for the first mounting arm 40 and second mounting arm 50 places the points of attachment 41*d*, 51*d* of the first ends 41, 51 laterally y lower than at least one point of attachment 42*a*, 52*a* of each second end 42, 52.

As shown in FIG. 1, a motorcycle 100 with pullback or T-style handlebar 110 risers often has a higher handlebar 110 assembly. These motorcycles 100 may require the first mounting arm 40 and second mounting arm 50 to be rotated 180° wherein the points of attachment 41d, 51d of the first ends 41, 51 are laterally y higher than at least one point of attachment 42a, 52a of each second end 42, 52. Having a detent 41c in each leg 41b of the first mounting arm 40 and the second mounting arm 50 may allow the coupling assembly 30 to be used on motorcycle 100 with different heights in handlebars 110 without requiring additional parts.

As shown in FIGS. 1 and 3, the first and second docking mechanisms 60, 70 may now be installed on the motorcycle 100 handlebars 110. Preferably the first docking mechanism 60 and the second docking mechanism 70 may be installed on a flat, unobstructed piece of bar on either side of the center handlebar 110 clamp before the lower bend (not numbered) of the handlebars 110. Preferably the first docking mechanism 60 and the second docking mechanism 70 encircle the entire circumference of the handlebar 110 and fasteners 80 may be used to secure the first docking mechanism 60 and the second docking mechanism 70 to the handlebars 110.

After the first docking mechanism 60 and second docking mechanism 70 are installed on the handlebars 110, the windshield panel 20 may be attached. The first ends 41, 51 of the first mounting arm 40 and the second mounting arm 50 are inserted around the first docking mechanism 60 and second docking mechanism 70 respectively until the outwardly biased ball bearing enters into a detent 41c in the first mounting arm 40 and the second mounting arm 50. Placement of the first docking mechanism 60 and the second docking mechanism 70 may be adjusted to allow for proper spacing for insertion of the first mounting arm 40 and the second mounting arm 50.

To remove the windshield panel 20, the vehicle operate may grasp the first mounting arm 40 and second mounting arm 50 and firmly pull until the first mounting arm 40 and second mounting arm 50 disengage from the first docking mechanism 60 and the second docking mechanism 70. The biasing force exerted on the ball bearing controls the amount of force needed to disengage the first ends 41, 51 of the first mounting arm 40 and the second mounting arm 50 from the first docking mechanism 60 and the second docking mechanism 70. The biasing force may be adjustable to allow for more or less force to disengage the first and second mounting arm 50s. In the preferred embodiment the biasing force is adjusted by use of a set screw 64b 65 and an Allen wrench.

The coupling mechanism 20 may also be used to attach other accessories (not shown) to a motorcycle 100. Either a first mounting arm 40 or first and second mounting arm 50s may be fixedly attached to a saddlebag, a cup holder, or any other accessory needed while on a motorcycle. The first mounting arm 40 or first mounting arm 40 and second mounting arm 50 are then inserted around a first docking mechanism 60 or a first docking mechanism 60 and a second docking mechanism 70 installed on the motorcycle 100.

Once the first docking mechanism 60 and second docking mechanism 70 are attached to the motorcycle 100, the windshield panel 20 or other accessories may be quickly attached or removed from the first docking mechanism 60 and second docking mechanism 70 without the need of any tools.

I claim:

1. A windshield assembly, comprising:
   (a) a windshield panel; and
   (b) a coupling assembly configured and arranged for fixed attachment to the windshield panel and releasable attachment to a vehicle by means of an outwardly biased ball bearing and detent system wherein the biasing force is adjustable.

2. The windshield assembly, as recited in claim 1: wherein the outwardly biased ball bearing and detent system includes a first mounting arm having at least, (i) a first end defining a point of attachment and having a substantially U-shaped receiving member having at least one detent in one leg, and (ii) a second end defining one or more points of attachment and configured and arranged for fixed attachment to the windshield panel; and a second mounting arm having at least, (i) a first end defining a point of attachment and having a substantially U-shaped receiving member having at least one detent in one leg, and (ii) a second end defining one or more points of attachment and configured and arranged for fixed attachment to the windshield panel.

3. The windshield assembly, as recited in claim 2, wherein the outwardly biased ball bearing and detent system further includes a first docking mechanism configured and arranged for fixed attachment to a vehicle and a second docking mechanism configured and arranged for fixed attachment to a vehicle.

4. The windshield assembly as recited in claim 2, wherein the point of attachment of the first end of the first mounting arm is laterally offset from at least one of the points of attachment of the second end and the point of attachment of the first end of the second mounting arm is laterally offset from at least one of the points of attachment of the second end.

5. The windshield assembly as recited in claim 2, wherein the point of attachment of the first end of the first mounting arm is longitudinally offset from at least one of the points of attachment of the second end of the first mounting arm and the point of attachment of the first end of the second mounting arm is longitudinally offset from at least one of the points of attachment of the second end of the second mounting arm.

6. The windshield assembly recited in claim 1, wherein the coupling assembly is for attachment to a handlebar of the vehicle.

7. The windshield assembly recited in claim 6, wherein the vehicle is a motorcycle.

* * * * *